US012607247B2

(12) United States Patent
Strack et al.

(10) Patent No.: US 12,607,247 B2
(45) Date of Patent: Apr. 21, 2026

(54) ENERGY CHAIN HAVING A SKID, AND SKID RETROFITTABLE THEREFOR

(71) Applicant: IGUS GMBH, Cologne (DE)

(72) Inventors: Stefan Strack, Königswinter (DE); Jörg Dommnik, Cologne (DE); Andreas Hermey, Hennef (DE)

(73) Assignee: igus SE & Co. KG, Cologne (DE)

( * ) Notice: Subject to any disclaimer, the term of this patent is extended or adjusted under 35 U.S.C. 154(b) by 388 days.

(21) Appl. No.: 18/554,459

(22) PCT Filed: Apr. 7, 2022

(86) PCT No.: PCT/EP2022/059283
§ 371 (c)(1),
(2) Date: Oct. 6, 2023

(87) PCT Pub. No.: WO2022/214601
PCT Pub. Date: Oct. 13, 2022

(65) Prior Publication Data
US 2024/0191776 A1 Jun. 13, 2024

(30) Foreign Application Priority Data
Apr. 9, 2021 (DE) ..................... 20 2021 101 925.5

(51) Int. Cl.
*F16G 13/16* (2006.01)
(52) U.S. Cl.
CPC ................................... *F16G 13/16* (2013.01)
(58) Field of Classification Search
CPC .............................. F16G 13/16; H02G 11/006
See application file for complete search history.

(56) References Cited

U.S. PATENT DOCUMENTS

| 10,378,610 B2 | 8/2019 | Jaeker |
| 2017/0227090 A1 | 8/2017 | Glissman et al. |
| 2019/0219135 A1 | 7/2019 | Chen et al. |

FOREIGN PATENT DOCUMENTS

| CN | 211901459 | 11/2020 |
| CN | 212407459 | 1/2021 |
| DE | 102006019966 | 1/2007 |

(Continued)

OTHER PUBLICATIONS

Translation of DE-202008005165.*

(Continued)

*Primary Examiner* — Bobby Yeonjin Kim
(74) *Attorney, Agent, or Firm* — Grossman, Tucker, Perreault & Pfleger, PLLC

(57) ABSTRACT

An energy chain with skids which are each fastened to a cross bar by means of a holding device and which each reach over a narrow side of a side plate, as well as to a retrofittable skid per se. At both of its ends the cross bar has in each case a widening towards the side plate. The holding device has two opposing holding elements, which are spaced apart in the longitudinal direction and with which it can be fitted onto the cross bar between the widenings and can be displaced laterally outwards into an engagement with one of the widenings, in which engagement the opposing holding elements engage in a positive-locking and/or force-locking manner in or behind an area of this widening to fasten the skid in the operative position.

16 Claims, 6 Drawing Sheets

(56) References Cited

FOREIGN PATENT DOCUMENTS

| DE | 202006019646 | | 4/2007 | | |
|----|--------------|----|--------|----|----|
| DE | 202008005165 | | 9/2008 | | |
| DE | 202008005165 | U1 * | 9/2008 | ............ | F16G 13/16 |
| DE | 202020100606 | | 3/2021 | | |
| EP | 0415029 | | 3/1991 | | |
| EP | 3189568 | | 7/2020 | | |
| WO | 2007/121716 | | 11/2007 | | |
| WO | WO-2007121716 | A1 * | 11/2007 | .......... | H02G 11/006 |
| WO | 2020/152263 | | 7/2020 | | |

OTHER PUBLICATIONS

Translation of WO-2007121716.*
Office Action from corresponding Taiwanese Appln. No. 111113430, dated Aug. 20, 2025, English translation attached.
International Search Report from corresponding PCT Appln. No. PCT/EP2022/059283, dated Aug. 8, 2022.
International Preliminary Report on Patentability from corresponding PCT Appln. No. PCT/EP2022/059283, dated May 11, 2023.

* cited by examiner

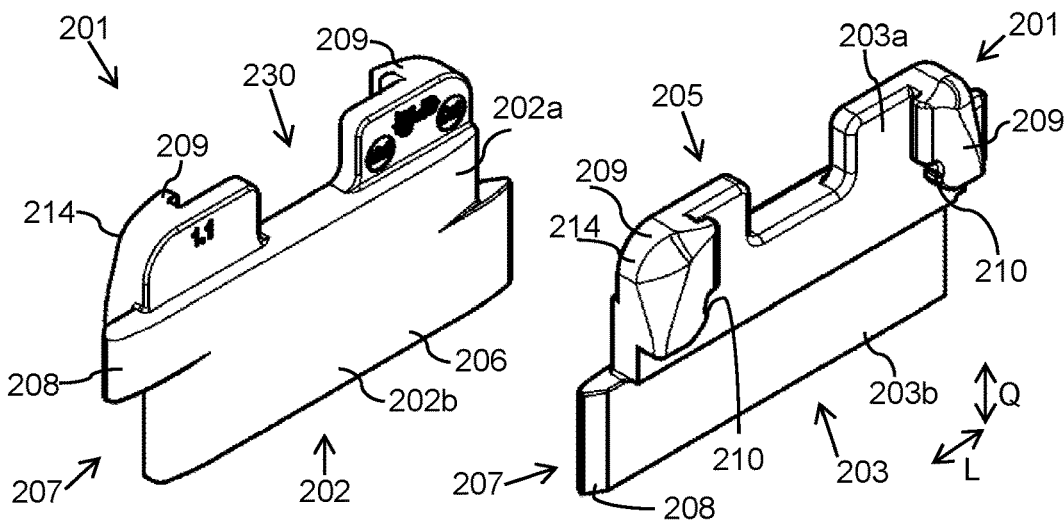
FIG.2A                    FIG.2B
A-A:
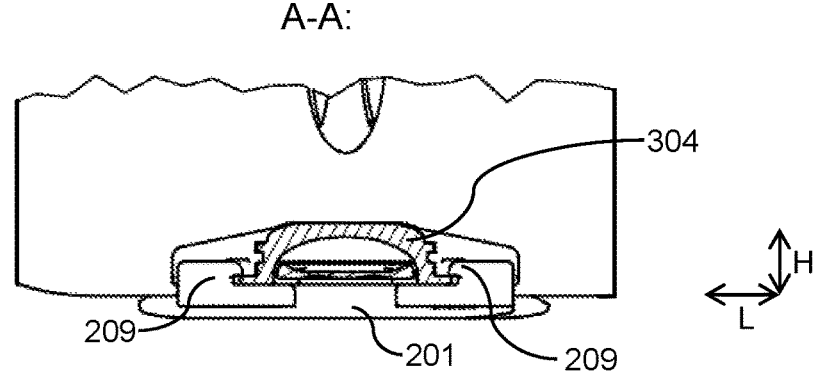
FIG.3A
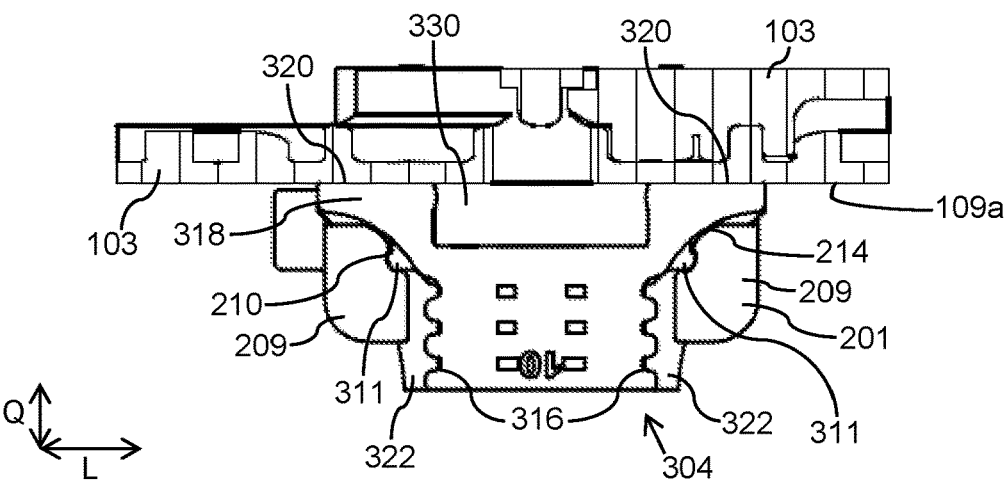
FIG.3B

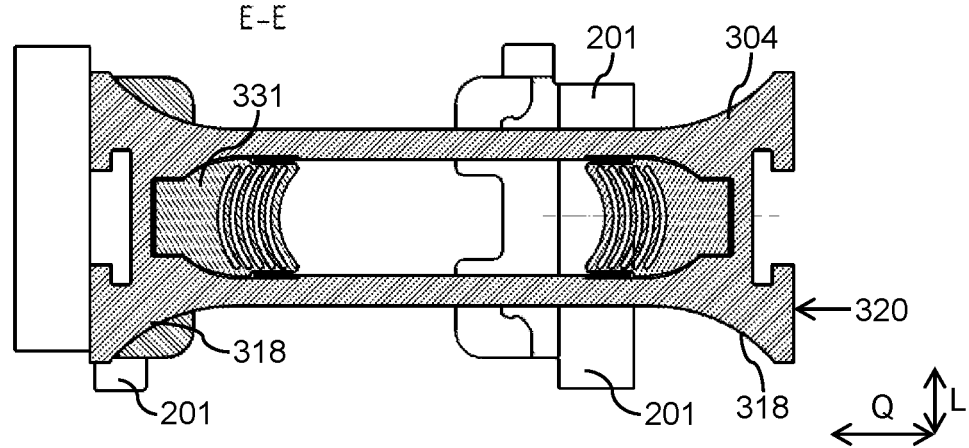
FIG.3E
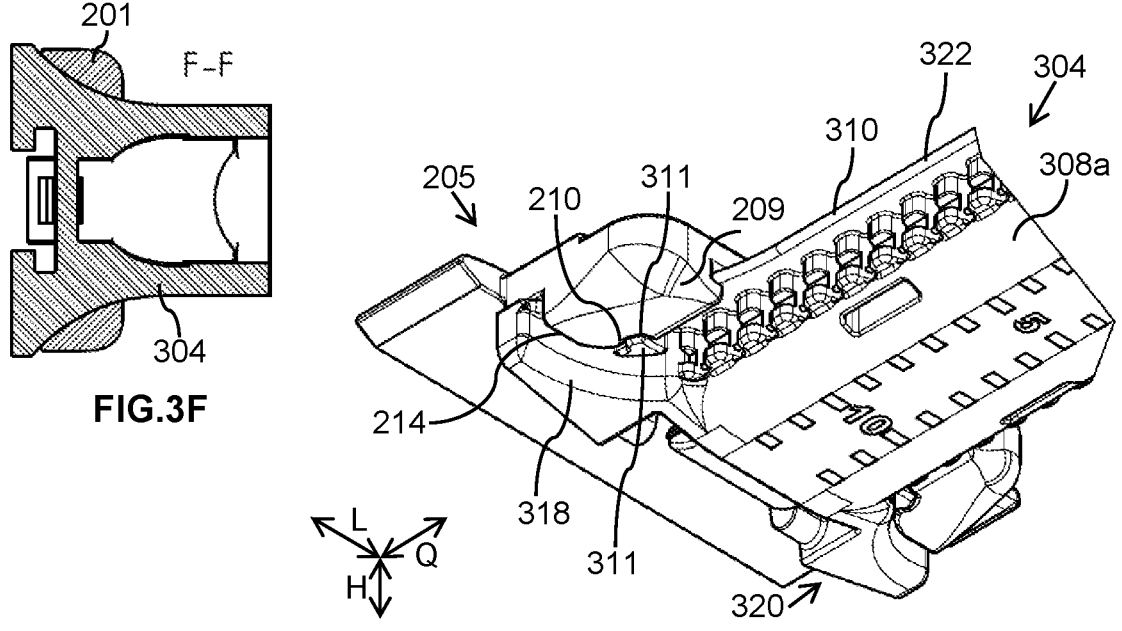
FIG.3F
FIG.3G

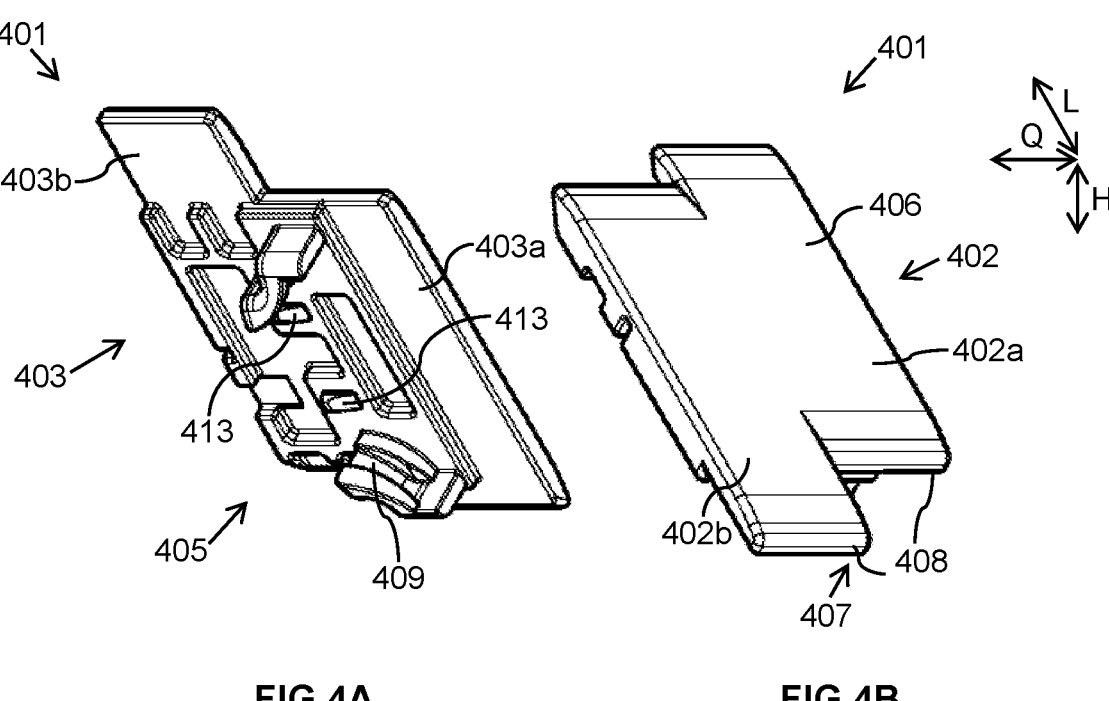
FIG.4A          FIG.4B
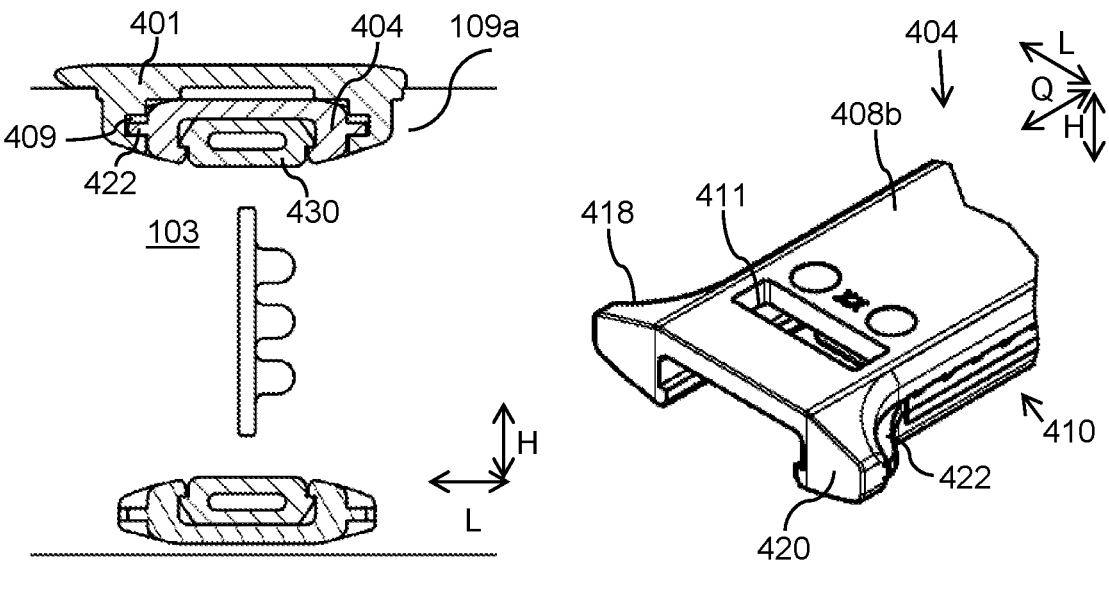
FIG.4C          FIG.4D

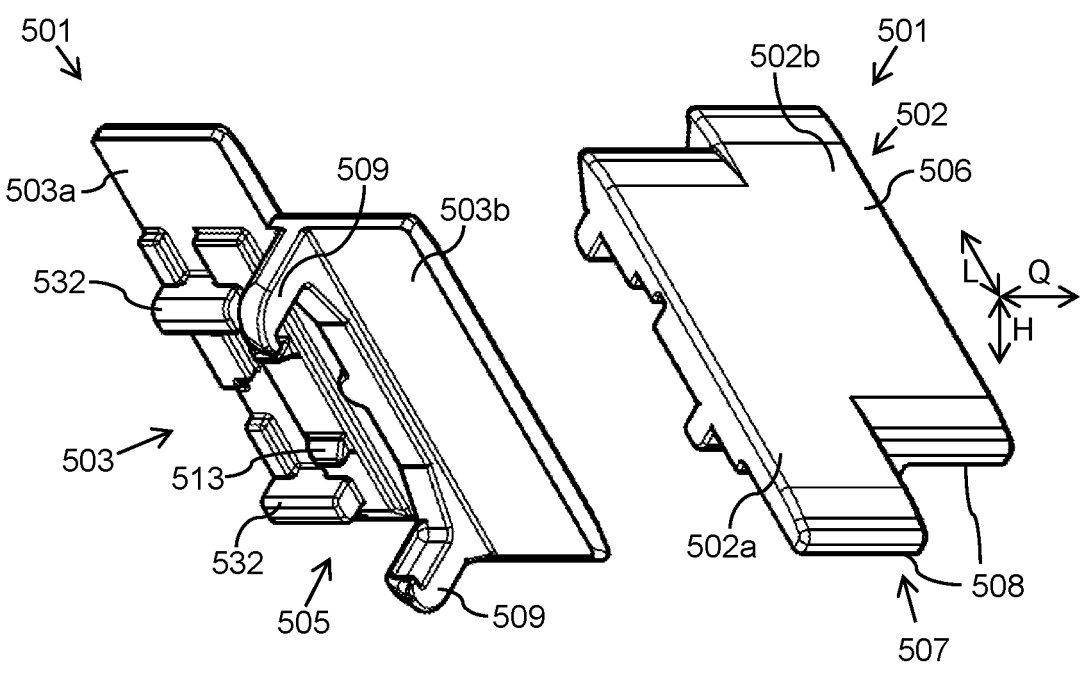
FIG.5A        FIG.5B
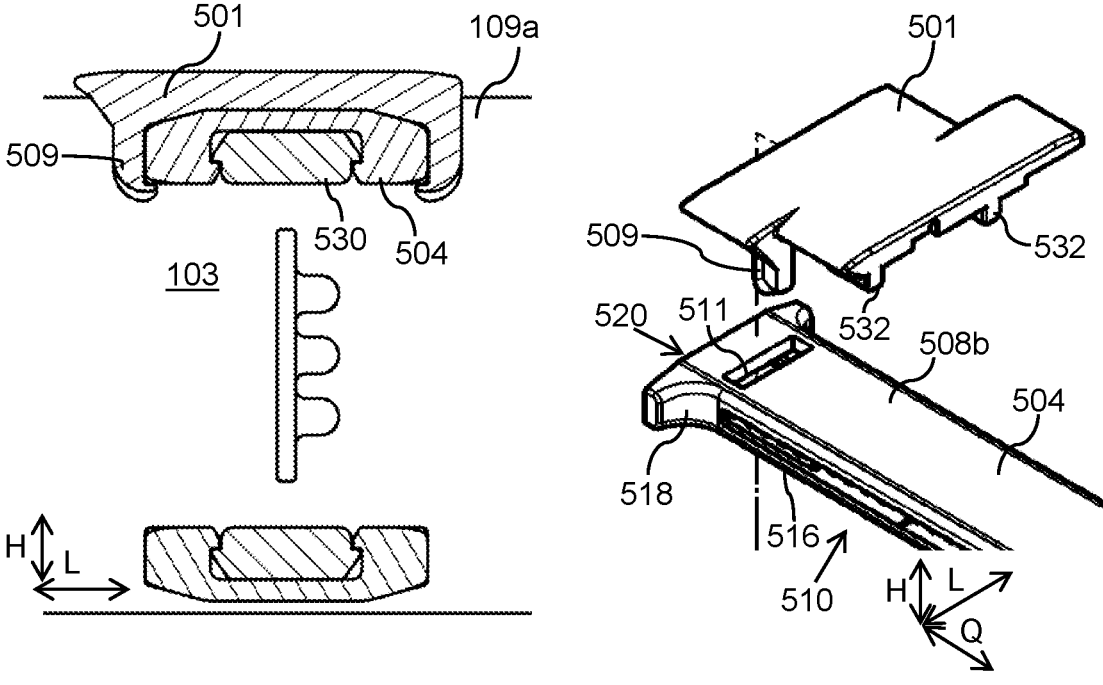
FIG.5C        FIG.5D

ENERGY CHAIN HAVING A SKID, AND SKID RETROFITTABLE THEREFOR

FIELD

The invention relates generally to an energy chain for dynamically guiding lines, such as e.g. cables, hoses or the like, between two connection points, of which at least one is movable relative to the other, as well as a retrofittable skid for such energy chains.

Such energy chains comprise a plurality of links connected in the longitudinal direction, which are pivotable relative to each other and each have two side plates and cross bars which connect these to each other and which delimit a receiving space, transverse to the longitudinal direction, for the lines to be guided. In the case of a relative movement of the connection points, the energy chain is movable, forming two runs which merge over a deflection area.

The invention relates in particular to an energy chain which is intended for long travels. In the case of long travels, the moving run can rest and move on the stationary run in sections. In the case of long travels, the energy chain is usually also guided in a guide channel. In the area not supported on the stationary run, the moving run can move on a slide rail.

The mutual friction of the runs and of the movable run on the slide rail causes wear. In order to reduce this wear it is known to equip energy chains with skids or sliding shoes which slide on each other. Alternatively, friction can be completely prevented if the energy chain is provided with rollers.

The present invention relates to an energy chain which is arranged lying in a sliding manner or slidably and the upper run of which can slide on the lower run. The invention relates in particular to such a so-called sliding energy chain which, for sliding, is equipped with skids in at least one longitudinal section on the inner side in the deflection area. Typically, a pair of skids is arranged on each of the chain links.

BACKGROUND

Skids for energy chains, also called sliding shoes in the art, are known, for example, from EP 0 415 029 A2 as well as DE 10 2006 019 966 A1. The skids according to EP 0 415 029 A2 or according to DE 10 2006 019 966 are removable and are fastened to the side plates by means of locking. This requires special side plates which are equipped with catch means which cooperate with the catch means of the skids.

Skids have already been developed which are provided on removable cross bars, which are suitable for retrofitting existing energy chains. In an embodiment example from WO 2007/121716 A1 it is provided that in each case a pair of skids is produced in one piece with a cross bar. Here, in an operating position the skids lie on the chain link above the narrow sides of the side plates or cover them.

However, to retrofit existing energy chains, in this embodiment example from WO 2007/121716, the existing cross bars must be removed and replaced by cross bars with skids.

It is therefore an object of the present invention to develop an easier retrofitting of energy chains with skids, which in particular does not require the chain links to be opened and nonetheless provides an adequate hold for the skids.

Generic energy chains for sliding applications in each case have a pair of skids on the inner side in the deflection area and on the links on at least one longitudinal section, wherein both skids of a pair are fastened in each case to a cross bar by means of a holding device and in each case reach over a narrow side of one of the two side plates in the operative position.

In the case of a generic energy chain, the above-mentioned object is already achieved in that, at its two ends at which it is connected to the respective side plate, at least the cross bar provided with skids has in each case a widening towards the side plate. The holding device has two opposing holding elements which are spaced apart in the longitudinal direction and with which the holding device can be fitted onto the cross bar between the widenings and can be displaced laterally outwards into an engagement with one of the widenings, in which engagement the opposing holding elements engage in a positive-locking and/or force-locking manner in or behind an area of this widening to fasten the skid in the operative position. Thus, an engagement on the side plate is not necessary.

The invention further relates to a retrofittable skid for an energy chain. A generic skid comprises at least an upper-side sliding surface and an underside holding device for fastening the skid to a link of the energy chain.

According to the invention it is proposed that the holding device is designed for cooperating with one of two end-side widenings of a cross bar and for this has two mutually opposing holding elements which are spaced apart in the longitudinal direction and with which the holding device can be fitted onto the cross bar between the widenings and can be displaced laterally outwards, in particular towards an end of the cross bar or towards one of the side plates, into an engagement with one of the widenings, wherein the opposing holding elements are designed to engage in a positive-locking and/or friction-locking manner in or behind an area of this widening.

In particular, the skid is formed such that, in its operative position, it reaches over a narrow side of one of the two side plates.

The solution according to the invention has the advantage that the skids can be installed easily and without a special tool; namely by fitting onto the cross bar and pushing into the engagement position. The skids can be removed from the cross bar again in the reverse order in an uncomplicated manner, with the result that they can be easily exchanged as required. The fitted skids are easily accessible, in particular without removing the energy chain from the guide channel.

The skids according to the invention are easily retrofittable, with the result that an existing energy chain can be equipped with the skids directly in the guide channel.

Furthermore, an energy chain originally sliding without skids, with already worn narrow sides of the side plates, can also be subsequently equipped with skids. Thus, an otherwise critically worn chain can be repaired with sliding shoes before the wear becomes critical. Thus, the life of an existing, already installed energy chain can be extended in a cost-saving manner.

The fastening of the skids on the cross bar is particularly robust despite the easy installation and removal. On the one hand, the greater distance between the two holding elements provides a longer lever for the reaction force which acts against a removal of the skid from cross bar, which is favoured by friction forces. On the other hand, during disassembly as intended in the direction transverse to the longitudinal direction of the energy chain, the skid can be displaced on the cross bar, i.e. transverse to the direction of action of the typical load, for example by the friction forces.

A further advantage of the solution according to the invention is the compact and space-saving fastening of the skids, with the result that sufficient space remains on the cross bar for attaching separating bars. Separating bars can be attached between the cross bars and parallel to the side plates to subdivide the receiving space of a chain link.

The term longitudinal direction generally refers to the direction of the longitudinal extension of the energy chain or of the lines guided or to be guided in the chain. The side plates, pivotably connected to each other, of a plate strand of the energy chain are, for example, connected to each other in the longitudinal direction. Two plate strands of the energy chain are connected to each other in a transverse direction, in particular perpendicular to the longitudinal direction, by cross bars. Two opposing side plates of a link of the energy chain or of a chain link are spaced apart from each other in the transverse direction. The direction of the plate height or the height direction runs perpendicularly to the longitudinal and to the transverse direction. A chain link can have two cross bars which are spaced apart from each other in the height direction. A movement plane in which the energy chain can move is the plane in which the longitudinal and the height direction lies. During movement, the energy chain is bent or deflected about a deflection axis, which can run perpendicular to the movement plane.

Side plates and cross bars are formed plate-like. A side plate has two main sides—a main side which forms the inner surface, which faces the receiving space of the chain link, and a main side which forms the outer surface, which faces away from the receiving space of the chain link. A side plate further has two long narrow sides, which are extended in the longitudinal direction, and two short narrow sides, which point in the longitudinal direction. A cross bar also has two main sides—an underside, which faces the receiving space of the chain link, and an upper side, which faces away from the receiving space of the chain link. The terms upper side and underside are in particular not used in relation to a vertical since the arrangement in the upper run relative to the vertical is reversed compared with the lower run. The cross bar further has two narrow sides or front sides, which extend in the transverse direction and point in the longitudinal direction, as well as two short narrow sides, which extend in the longitudinal direction and form supporting surfaces for abutment on the inner surfaces of the side plates.

The main sides of the cross bar become wider towards the ends of the cross bar. These end-side widenings of the cross bar result in the end-side supporting surfaces having a larger dimension in the longitudinal direction compared with the central cross section of the cross bar. In each case two skids are fitted onto one cross bar, with respect to the transverse direction, between the end-side widenings and are displaced laterally outwards, i.e. towards the widenings or towards the side plates, along the cross bar, until the holding device of the respective skid comes into engagement with the corresponding widening or is fitted on the widening. The mutually opposing holding elements of the respective skid that are spaced apart from each other in the longitudinal direction engage in a positive-locking and/or force-locking manner in or behind this widening or in or behind the front sides of the cross bar in the area of the widening.

The holding elements of the skid cooperate with the respective end-side widenings of the cross bar in the engagement position in order to secure the skid, in particular against displacement in the longitudinal direction of the energy chain, as well as against removal of the skid in the height direction of the chain link. In other words, the holding elements secure the skid against displacement in the movement plane of the energy chain, in which the longitudinal direction and the height direction lie.

The holding device of the skid preferably has at least one latching element, which locks with a protrusion and/or a depression on the cross bar in order to secure the skid against a lateral displacement, i.e. displacement along the cross bar, in the operative position of the skid or in the engagement position of the holding elements with the respective widening. In other words, the latching elements secure the skid against displacement perpendicular to the movement plane of the energy chain.

In one embodiment, on each of its widenings the cross bar can in each case have two front-side latching protrusions or latching lugs for locking to the skids. The holding device of the skid can in particular have two latching elements which are spaced apart from each other in the longitudinal direction or in the direction of sliding and which each cooperate in a latching manner with one of two front-side latching lugs on the widening of the cross bar. The latching elements can, for example, be designed as latching edges, which engage behind the latching lugs in a positive-locking manner after the skid has been pushed into the latching position or into the intended operative position.

Alternatively or additionally, the latching elements of the skids can cooperate in a latching manner with an upper-side tool opening which can be provided on the cross bar for detaching the cross bar from the side plate. In this case, the latching elements can be formed in particular as latching cams, which engage in the tool opening in the operative position of the skid.

The skid can in particular be designed plate-like and have two main sides—a main side, also called upper side, which forms the sliding surface, as well as the main side facing away from the sliding surface, also called underside or fastening side. The terms underside and upper side do not refer to a particular vertical arrangement. Furthermore, the skid can have two narrow sides extended in the longitudinal direction as well as two front sides pointing in the longitudinal direction.

The holding elements of the skid can be designed as mutually facing holding jaws, holding claws or as protrusions with mutually facing holding grooves, for example. The holding elements can protrude on or from an underside or fastening side of the skid facing away from the sliding surface.

In one embodiment, the holding elements engage around the front sides, pointing in the longitudinal direction, of the cooperating area of the widening and engage behind the widening or the cross bar in the area of the widening.

Alternatively or additionally, the holding elements can cooperate in a positive-locking manner with a depression or a protrusion, in particular with a fastening rib, on the front sides, pointing in the longitudinal direction, of the corresponding area of the widening.

The holding device can in particular have a pair of guide elements which are spaced apart from each other in the longitudinal direction and from the holding elements in the transverse direction and which, in the case of a displacement of the skid into the operative position, slide on the front sides of the cross bar and abut thereon in the operative position. The guide elements provide an additional stabilization of the skid.

In one embodiment, the skid can have an upper-side sliding surface which comprises two sliding areas: one laterally outer sliding area for engaging over a narrow side of the respective side plate in the operative position and one inner sliding area offset in the longitudinal direction, underneath which the holding device is arranged. The outer sliding area can preferably be self-supporting. The outer sliding area is at a greater distance from the receiving space of the chain link or from the centre of the cross bar than the inner sliding area, relative to the transverse direction.

An underside bearing surface for resting on the narrow side of the respective side plate can preferably be provided underneath the outer sliding area. If the skid is placed on another skid, on a narrow side of a side plate or else on a slide rail, the bearing surface of the skid can preferably first come to rest or abut on the narrow side of the respective side plate protected by the skid before the holding device of the skid, which holds the skid on the cross bar, is loaded. That is of advantage in order to keep the action of a shear force on the holding device of the skid as small as possible.

The offset of the sliding areas relative to each other in the longitudinal direction can in particular serve to prevent the skids which are fastened to successive side plates from bumping into each other or colliding when the side plates are in a fully angled position relative to each other.

The skid can preferably have front-side ramps, which point in the longitudinal direction. The ramps prevent interfering edges and can in particular serve to prevent an undesired tilting or jamming of the skid of successive chain links during movement. The ramps are particularly preferably provided on every sliding area.

The holding elements of the skid can preferably have contact surfaces which can be formed complementary to or congruent with continuously expanding or, in the longitudinal direction, continuously diverging front faces or surfaces of the front sides at ends of the cross bar or on end-side widenings thereof. The effective engagement surface, via which the skid is in engagement with the cross bar, can thereby be enlarged to achieve a particularly robust fastening of the skid to the cross bar.

The side plates and the cross bars can preferably be produced from plastic, in particular from a reinforced plastic. The side plates and/or cross bars can also be manufactured from metal.

The skid can preferably be produced as a separate, one-piece plastic part, in particular injection-moulded part.

The skid can preferably be produced from a special tribologically optimized plastic or have such a plastic at least on the sliding surfaces. The plastic is preferably chosen such that, in the case of friction pairing with the same plastic, it has abrasion behaviour, wear behaviour and/or friction behaviour optimized for each other with respect to friction of the side plate material. The tribologically optimized plastic can in particular have a more favourable friction coefficient and/or contain a tribopolymer with incorporated lubricants, e.g. solid particles, or also liquid or waxy lubricants.

The cross bar can abut on an inner surface of the respective side plate with lateral supporting surfaces of its widenings and preferably protrude beyond the next plate with its ends. Thus, the widenings of the cross bars can each support two side plates in the transverse direction.

The cross bar is preferably removably fastened to a fastening protrusion of the side plate by a lever mechanism. Here, the skid has a cutout for an operating lever of the cross bar on its upper side or on its main side having the sliding surface. A preferred fastening and lever mechanism is described in the published document WO 2020/152263 A1 of the applicant, wherein the description there of the fastening and lever mechanism is incorporated here by reference.

In a further embodiment, the cross bar is fastened in a latching manner to a latching horn, which can be provided on the inner surface of the respective side plate.

The cross bar can have two toothed strips, which extend between the two ends of the cross bar and serve for fastening the separating bars. The toothed strips can in particular be formed on the underside of the cross bar, which faces the receiving space in the intended position of the cross bar in a chain link. Alternatively or additionally, the toothed strips can be arranged within front-side grooves of the cross bar.

The invention furthermore relates to a chain link for an energy chain, comprising two side plates and two cross bars connecting them, wherein at least one cross bar comprises two skids according to one of the preceding embodiments.

BRIEF DESCRIPTION OF THE DRAWINGS

Further details, features and advantages of the invention follow—without limiting the generality of the above teaching—from the detailed description below of preferred embodiment examples with the aid of the attached illustrations. There are shown in:

FIGS. 2A-2B: a first embodiment example of a skid in a perspective view;

FIGS. 3A-3F: an embodiment example of an energy chain with skids according to FIGS. 2A-2B: in the cross section through a cross bar along A-A according to FIG. 3C (FIG. 3A); in a partial view on the side of the receiving space (FIG. 3B); a portion of the energy chain in a top view (FIG. 3C); a cross bar with skids according to FIGS. 2A-2B in a front view (FIG. 3D); the cross bar with two skids in the longitudinal section along E-E according to FIG. 3D (FIG. 3E), an end area of the cross bar in a longitudinal section along F-F according to FIG. 3D (FIG. 3F); as well as the end area of the cross bar according to FIG. 3E in a perspective view (FIG. 3G);

FIGS. 4A-4D: a further embodiment example with a skid, in a perspective view onto its holding device (FIG. 4A), in a perspective view onto the sliding surface (FIG. 4B), a portion of the energy chain with skids according to FIG. 4A in cross section (FIG. 4C) as well as an end area of the cross bar in a perspective view (FIG. 4D); and FIGS. 5A-5D: a further embodiment example with a skid, in a perspective view onto the holding device (FIG. 5A); the skid in a perspective view onto the sliding surface (FIG. 5B); a portion of the energy chain with skids according to FIG. 5A in cross section (FIG. 5C) as well as an end area of the cross bar with an unmounted skid in a perspective view (FIG. 5D).

DETAILED DESCRIPTION

Figure 1A:
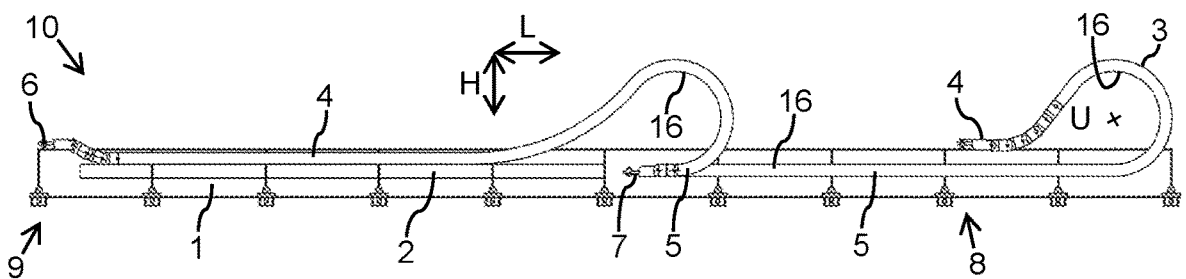
FIGS. 1A-1C: a schematic side view of an energy guiding arrangement for long travels (FIG. 1A); a portion of the energy chain according to FIG. 1A in a side view, in an intermediate position with an upper run which rests on the lower run (FIG. 1B); as well as a portion of the energy chain according to FIG. 1A in a perspective view (FIG. 1C)
Figure 1B:
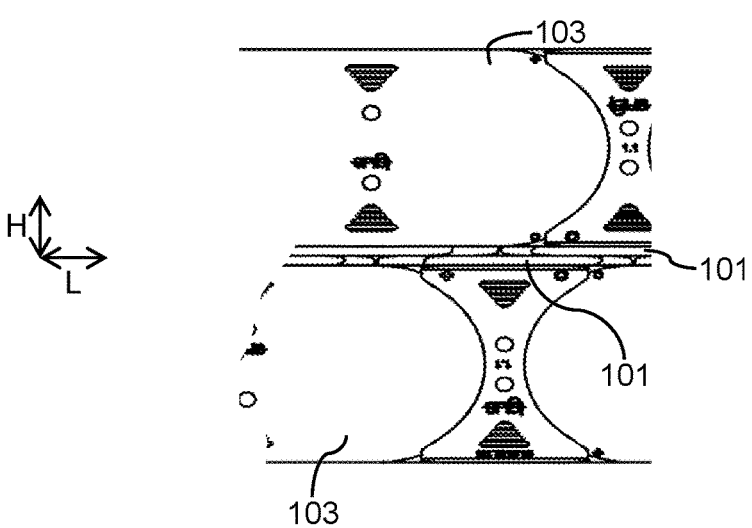
Figure 1C:
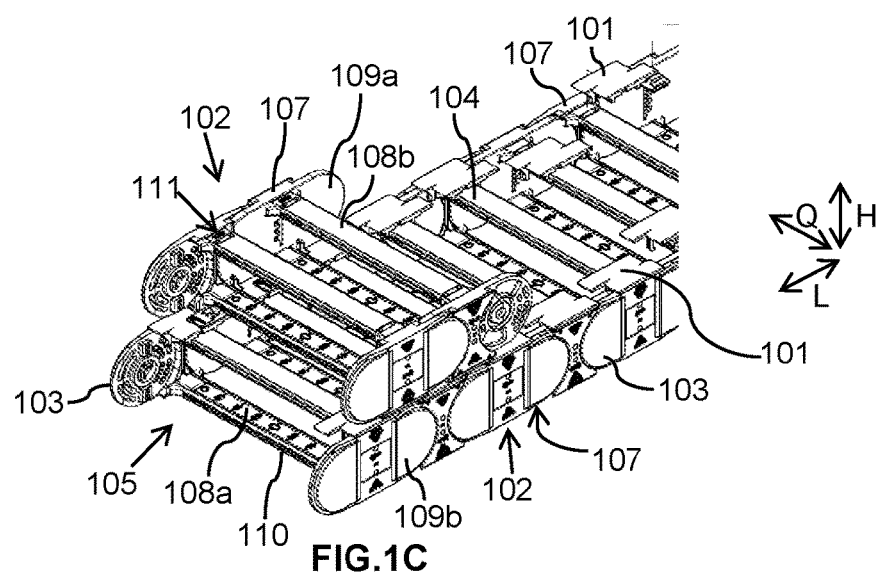

The sliding energy guiding arrangement for long travels, shown purely by way of example in FIG. 1, comprises an energy chain 10, which moves in a guide channel 1 between two end points 8, 9 of the travel, namely forming a deflection area or deflection curve 3 of an upper run 4, which here is the moving run connected to a movable connection point 6, as well as a stationary run or a lower run 5, which is connected to a fixed connection point 7. The energy chain 10 moves in a movement plane which corresponds to the plane of FIGS. 1A and 1$n$ which the longitudinal direction L and the height direction H perpendicular to the longitudinal direction L lie. The deflection axis U is perpendicular to the movement plane. The energy chain 10 guides supply lines in the longitudinal direction L from an energy source to a machine part to be powered and is represented here in two end positions. On the right in FIG. 1A, the movable connection point 6 is completely extended to the right to the first end point 8, with the result that the upper run 4 is present as a short self-supporting section. In the case of a movement of the connection point 6 to the left, the upper run 4 will first bear on the lower run 5 and slide thereon. This interim position of the energy chain 10 is represented in FIG. 1B and FIG. 1C in a greatly enlarged partial view. If the movable connection point 6 has moved past the fixed connection point 7, it slides further on the slide rail 2. On the left in FIG. 1A, the movable connection point 6 is completely extended to the left to the second end point, with the result that the upper run 4 rests completely on the slide rail 2.

FIG. 1C shows a portion of the energy chain 10 with six chain links 102 of the lower run 5 and two chain links 102 of the upper run 4 sliding on the lower run 5. A link 102 of the energy chain 10 is constructed from two side plates 103 and two cross bars 104 connecting these side plates 103 in the transverse direction Q, wherein around the longitudinal direction L the side plates 103 with the cross bars 104 surround a receiving space 105 for the supply lines to be guided. The cross bars 104 of a chain link 102 are spaced apart from each other in the height direction H. Each side plate 103 has two long narrow sides 107 and two main sides, namely the main side with the inner surface 109a facing the receiving space 105 as well as the main side with the outer surface 109b facing away from the receiving space 105. One of the narrow sides 107 lies on the side 16 of the energy chain 10 lying inside in the deflection area 3. Each cross bar 104 has two main sides, an underside 108a facing the receiving space 105 and an upper side 108b facing away from the receiving space 105, as well as two long front sides 110 extending in the transverse direction Q and two short narrow sides extending in the longitudinal direction L, which form supporting surfaces 111 for abutment on the inner surfaces 109a of the side plates 103.

On the side 16 lying inside in the deflection area, which faces the deflection axis U, the energy chain 10 is equipped with skids 101, which cover the narrow sides 107 of the side plates 103, with the result that, in the interim position represented in FIG. 1B, the skids 101, which are attached to the narrow sides 107 of the side plates 103 of the upper run 4, slide on the skids 101, which are attached to the narrow sides 107 of the side plates 103 of the lower run 5. The respective narrow sides 107 of the side plates 103 are thereby protected against wear. The skids 101 are produced from a different plastic from the side plates, which can where appropriate also be made of metal. The plastic of the skids 101 is chosen such that, with respect to the material of the side plates 103, it has abrasion behaviour, wear behaviour and/or friction behaviour optimized for each other with regard to the sliding of the same material. The plastic can have a more favourable friction value, in particular an improved friction coefficient μ, and can, for example, consist of a tribopolymer which comprises lubricants, e.g. embedded solid lubricants.

The skids 101 are removably attached to the cross bars 104 of the links 102 of the energy chain 10 and can be exchanged as required, without the energy chain 10 needing to be removed from the guide channel 1.

FIG. 2-FIG. 5 show three embodiment examples of the energy chain or of the skids which use a principle according to the invention for the toolless installation and removal of skids on the cross bars, but which differ in design details.

FIGS. 2A, 2B show a skid 201 according to a first embodiment example. The skid 201 is designed plate-like with two main sides—an upper side 202, which forms the sliding surface 206, and an underside 203, which faces away from the sliding surface 206 and on which a holding device 205 is provided for holding on a cross bar 304. Furthermore, the skid 201 has two front sides 207 pointing in the longitudinal direction L that are provided with ramps 208.

The holding device 205 comprises two holding elements spaced apart from each other in the longitudinal direction L in the form of mutually facing holding jaws 209, which are formed for engaging around front sides 310 at the ends of a cross bar 304, as well as two latching elements which are spaced apart from each other in the longitudinal direction L and which are formed in each case as an undercut or latching edge 210 on the respective holding jaw 209, for engaging behind a latching protrusion or a latching lug 311 on the cross bar 304 (FIG. 3B) in the operative position of the skid 201. The holding jaws 209 are preformed on the two front sides 207 of the skid 201 and angled towards the underside 203 of the skid 201. Thus, the holding device 205 has a clip-like shape in a side view along the transverse direction Q. The holding jaws 209 have in each case a preferably concave contact surface 214 which is formed complementary to or matching the preferably convex end-side front faces of the cross bar 304 and abuts on them in the operative position.

The skid 201 is formed cranked with two areas of surface 203a, 203b on the underside 203 and an offset or protrusion 203c in the height direction H or in the direction of the thickness or magnitude of the skid 201 between the area of surface 203a, 203b. Thus, in the intended operative position of the skid 201, the area of surface 203a will rest on the upper side 308b of the cross bar 304. The above-mentioned holding jaws 209 are arranged on this area of surface 203a. In the intended operative position of the skid 201, the area of surface 203b rests on the narrow side 107 like a bearing surface.

The upper side 202 or the sliding surface 206 of the skid 201 also comprises two areas of surface 202a, 202b, but no offset between them. The sliding surface 206 is thus flat. The area of surface 202b is the laterally outer sliding area, which, in the operative position, reaches over a narrow side of the respective side plate. The holding jaws 209 are arranged underneath the area of surface 202a or the inner sliding area. The area of surface 202a is offset relative to the area of surface 202b in the longitudinal direction L. However, the sliding surface 206 is continuous; the areas of surface 202a, 202b merge seamlessly into each other.

Figure 3C:
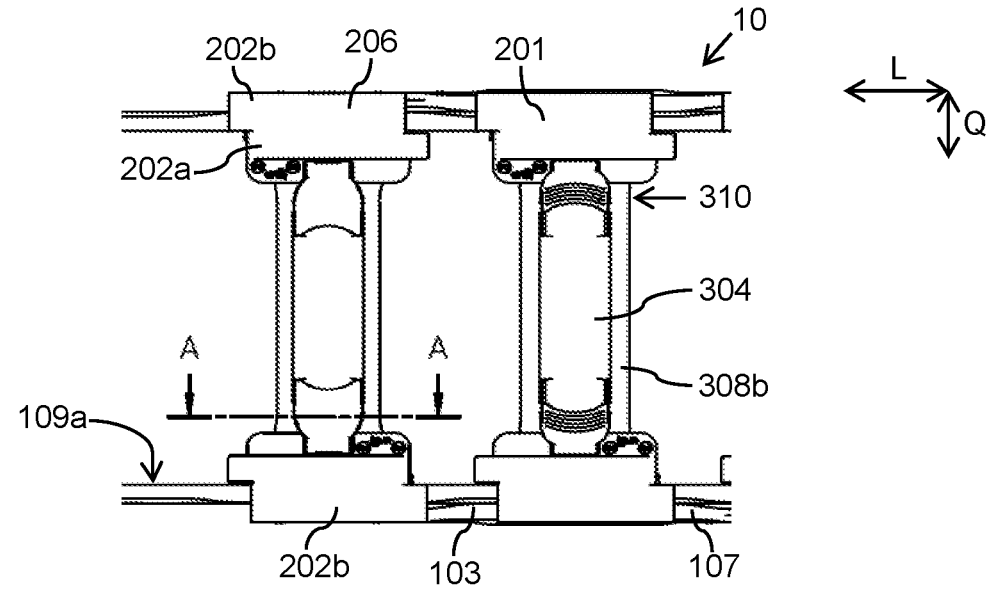

FIG. 3C shows the skids 201 in a top view onto the upper side or onto the sliding surface 206. The skids 201 are shown in the operative position, i.e. fitted onto the cross bars 304 of the energy chain 10 according to the first embodiment example. Here, it is clearly visible that the areas of surface 202a, 202b of the sliding surface 206 are offset relative to each other in the longitudinal direction L. This allows for a smaller radius in the deflection area 3 of the energy chain 10 because the successive skids would otherwise sterically interfere with the bending of the chain 10.

Figure 3D:
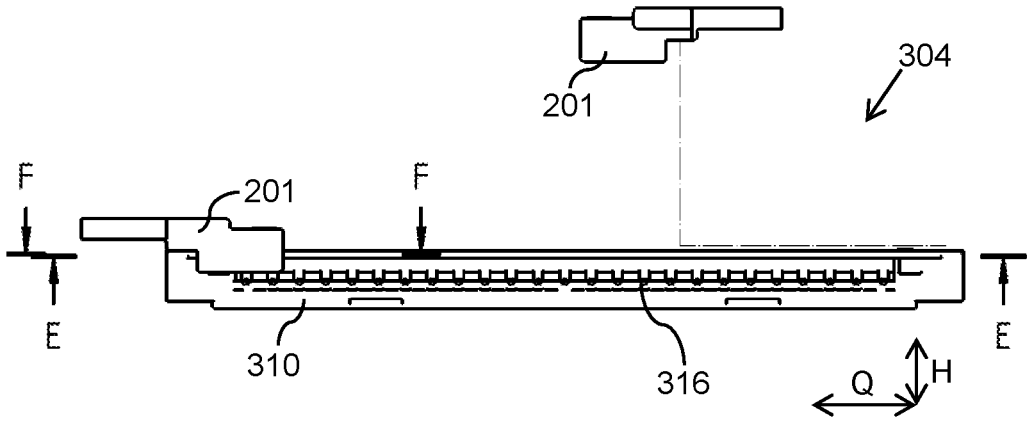

FIG. 3D shows a front view onto the front side 310 of the cross bar 304 with a skid 201 in the operative position, wherein the holding jaws 209 engage around the front sides 310 at one end of the cross bar 304. One of the two toothed strips 316, which are provided on the underside 308a of the cross bar 304 facing the receiving space 105 and serve to fasten the separating bars, can be seen.

FIG. 3B and FIG. 3G show, in each case in a partial view, an end of the cross bar 304 from its underside 308a, on which the two toothed strips 316 can be seen, which are flanked by fastening ribs 322 extending along the front sides 310 of the cross bar 304. On the shown end of the cross bar 304 there is a skid 201 in the operative position, i.e. the holding jaws 209 of the skid 201 engage over the end sides of the fastening ribs 322 on the front sides of the cross bar 304. The latching edges 210 engage behind the latching lugs 311 for locking the skid 201 on the cross bar 304 against lateral displacement. The holding jaws 209 prevent a removal of the skid in the longitudinal direction L and in the height direction H, wherein the latching lugs 311 prevent slippage in the transverse direction Q along the cross bar 304.

At its two ends (only one shown) the cross bar 304 has a widening 318 in each case, with the result that the ends of the cross bar 304 have a greater dimension in the longitudinal direction L, i.e. are wider than the central area of the cross bar 304. The widening 318 is depicted by continuously expanding or, with respect to the longitudinal direction L, continuously diverging front faces or surfaces of the front sides 310 in the shown end-side area of the cross bar 304. The contact surfaces 214 of the skid 201 are formed complementary to the preferably continuously curved shape of the diverging front faces 310 and abut on them.

A supporting surface 320, which abuts on the corresponding inside 109a of the side plate 103, namely in an overlapping area of two side plates 103, is provided on the respective widened end of the cross bar 304, as can be seen in FIG. 3B. Due to the widening 318, the supporting surface 320 has a greater extension in the longitudinal direction L than the cross section of the cross bar 304 between the end-side widenings 318.

In the case of an already existing energy chain 10, the skid 201 can be fitted onto the cross bar 304 in the central, less wide area of the cross bar 304 or the area between the widenings 318 and manually displaced to one end of the cross bar 304, i.e. towards one side plate 103 of the chain link 102 until it fits in a positive-locking manner on the widening 318 and locks with the latching lugs 311 using the latching edges 210.

To remove the skid 201 from the cross bar 304, the skid 201 only has to be manually unlocked and displaced by pulling laterally or in the transverse direction Q towards the centre of the cross bar 304. Then, the skid 201 can be removed easily from the cross bar 304 at a less wide point thereof.

Due to the above-described design of the holding device 205 of the skid 201, the latter can be easily installed on the cross bar 304 and removed from it again manually and toollessly and is nevertheless robustly connected to the cross bar 304 in the operative position.

In the example shown, the cross bar 304 is fastened to the side plate 103 with a fastening protrusion 330 thereof by means of a lever mechanism, according to the principle described in WO 2020/152263 A1 of the applicant, with regard to which reference is made here for brevity.

The skid 201 preferably has a cutout 230 for a corresponding operating lever 331 of the cross bar 304 from WO 2020/152263 A1 on its upper side 202, with the result that a relatively extensive sliding surface is nevertheless possible.

In the following description of further embodiment examples according to FIG. 4A to FIG. 5D, only important differences from the embodiment example shown in FIG. 2A to FIG. 3G will be discussed.

FIGS. 4A-4D show a further embodiment example of a retrofittable skid. At each of its ends, the cross bar 404 in FIGS. 4C, 4D has in each case two short fastening ribs 422, which protrude from the narrow sides 410 on the widenings 418. On its underside 403, the skid 401 shown in FIGS. 4A, 4B has a holding device 405, which is designed to match the fastening ribs 422 of the cross bar 404. In this embodiment example, a pair of protrusions with mutually facing holding grooves 409, which are formed complementary to the fastening ribs 422, serve as holding elements. Thus, when the skid 401 is slid into its operative position, the fastening rib 422 comes into positive-locking engagement with the holding groove 409.

Furthermore, the holding device 405 of the skid 401 has two latching elements in the form of two latching cams 413, which engage in the tool opening 411 of the cross bar 404 in the operative position. For the model range of the cross bar, the tool opening 411 can be provided as standard for removing the cross bar from a latching horn 430 of the side plate. The latching horn 430 is provided on the inner surface 109a of the respective side plate 103 for fastening the cross bar 404 in a latching manner.

FIGS. 5A-5D show a third embodiment example of a retrofittable skid. The cross bar 504 in FIGS. 5C, 5D also has a tool opening 511 as described above. Like the skid 401, the skid 501 has two latching elements in the form of latching cams 513, which latch with the tool opening 511 of the cross bar 504 in the operative position. Furthermore, the holding device 505 of the skid 501 has holding elements in the form of two holding claws 509 spaced apart from each other in the longitudinal direction L. The holding claws 509 protrude from the underside 503 of the skid 501 and form a clip with a C-shaped cross section which engages around or clasps the cross bar 504 at its respective end-side widening 518. Since the holding claws 509 clasp the front sides 510 of the cross bar 504 at its widening, they are spaced further apart from each other in the longitudinal direction L than the front sides 510 of the cross bar 504 in its central (with respect to the transverse direction Q) area. For the purpose of guiding during displacement of the skid 501 along the cross bar 504 into the operative position, the holding device 505 furthermore has two guide elements 532, the spacing of which from each other in the longitudinal direction L corresponds to the width of the cross bar or its dimension in the longitudinal direction L in its central area between the widenings. During displacement of the skid 501 into the operative position, the guide elements 532 slide on the front sides 510 of the cross bar 504 and abut on them in the operative position, namely offset relative to the holding claws in the transverse direction Q inwards towards the central area of the cross bar 504.

LIST OF REFERENCE NUMBERS 1 guide channel
2 slide rail
3 deflection area
4 upper run
5 lower run
6 movable connection point
7 fixed connection point
8 first end point of the travel
9 second end point of the travel
10 energy chain
16 inner side of the energy chain in the deflection area
101; 201; 401; 501 skid
102 link of the energy chain or chain link
103 side plate

11

104; 304; 404; 504 cross bar
105 receiving space
107a, 107b narrow sides of the side plate
108a; 308a; 408a underside of the cross bar
108b; 308b; 408b upper side of the cross bar
109a inner surface of the side plate
109b outer surface of the side plate
110; 310; 410; 510 front side of the cross bar
111; 320; 420; 520 supporting surface of the cross bar for
    abutment on the side plate
202; 402; 502 upper side of the skid
202a; 402a; 402a inner sliding area
202b; 402b; 402b outer sliding area
203; 403; 503 underside of the skid
203a; 403a; 503a underside area of surface of the skid
203b; 403b; 503b underside bearing surface of the skid
205; 405; 505 holding device of the skid
206; 406; 506 sliding surface of the skid
207; 407; 507 front side of the skid
208; 408; 508 ramp of the skid
Holding elements of the holding device:
209 holding jaw
409 holding groove
509 holding claw
Latching elements of the holding device:
210 latching edge
413; 513 latching cam
214; 414; 514 contact surfaces of the holding elements
230 cutout for operating lever
311 protrusion or latching lug on the cross bar
316; 516 toothed strip on the cross bar
318; 418; 518 widening of the cross bar
322; 422 fastening rib
330 fastening protrusion of the side plate
331 operating lever
411 tool opening on upper side of the cross bar
430; 530 latching horn on the inner surface of the side
    plate
532 guide element of the holding device
H height direction
L longitudinal direction
Q transverse direction
U deflection axis
What is claimed is:

1. An energy chain to guide at least one line between two connection points, of which at least one of the connection points is movable relative to the other, comprising:
    a plurality of links connected in a longitudinal direction, which are pivotable relative to each other and each have two side plates and cross bars connecting the side plates to each other, wherein in a case of a relative movement of the connection points, the energy chain is movable, forming two runs, which merge over a deflection area,
    wherein one run is slidable on the other run and, for the sliding, in each case a pair of skids are arranged on an inner side in the deflection area and on links of at least one longitudinal section, wherein both skids of a pair are fastened in each case to a cross bar by a holding device and in each case reach over a narrow side of one of the two side plates in an operative position,
    wherein at both of its ends, at least the cross bar provided with skids has in each case a widening towards the side plate, and
    wherein the holding device has two opposing holding elements, which are spaced apart in the longitudinal direction and with which the holding device is fittable onto the cross bar between the widenings and is displaceable laterally outwards into an engagement with one of the widenings, in which engagement the opposing holding elements engage in a positive-locking and/or force-locking manner in or behind an area of this widening to fasten the skid in the operative position.

2. The energy chain according to claim 1, wherein:
    the holding device has at least one latching element, which latches with a protrusion and/or a depression on the cross bar to secure the skid against lateral displacement in the operative position of the skid or in the case of engagement of the holding elements with the respective widening.

3. The energy chain according to claim 2, wherein the holding device has two latching elements spaced apart in the longitudinal direction, which:
    cooperate in a latching manner with one of two front-side latching lugs on the widening of the cross bar, and/or
    cooperate in a latching manner with an upper-side tool opening, which is provided for detaching the cross bar.

4. The energy chain according to claim 1, wherein the holding elements are configured as mutually facing holding jaws, holding claws or as protrusions with mutually facing holding grooves and protrude on or from an underside of the skid facing away from the sliding surface.

5. The energy chain according to claim 1, wherein the holding elements engage around the front sides, pointing in the longitudinal direction, of the cooperating area of the widening and engage behind the widening and/or cooperate in a positive-locking manner with a depression or a protrusion on the front sides, pointing in the longitudinal direction, of the corresponding area of the widening.

6. The energy chain according to claim 1, wherein the holding device has a pair of guide elements spaced apart from each other in the longitudinal direction, which slide on front sides of the cross bar in the case of a displacement of the skid into the operative position.

7. The energy chain according to claim 1, wherein the skid has an upper-side sliding surface with a laterally outer sliding area, which, in the operative position, reaches over a narrow side of the respective side plate, and an inner sliding area offset in the longitudinal direction, underneath which the holding device is arranged.

8. The energy chain according to claim 7, wherein an underside bearing surface for resting on the narrow side of the respective side plate is provided underneath the outer sliding area.

9. The energy chain according to claim 1, wherein the skid has front-side ramps pointing in the longitudinal direction.

10. The energy chain according to claim 1, wherein the holding elements each have a contact surface, which is formed complementary to continuously widening front faces at ends of the cross bar.

11. The energy chain according to claim 1, wherein the skid is produced as a separate, one-piece plastic part.

12. The energy chain according to claim 11, wherein the one-piece plastic part is an injection-molded part.

13. The energy chain according to claim 1, wherein at least on the sliding surfaces, the skid has a plastic with abrasion behavior, wear behavior and/or friction behavior optimized with respect to the material of the side plates.

14. The energy chain according to claim 1, wherein:
    the cross bar abuts on an inner surface of the respective side plate with lateral supporting surfaces of its widenings.

15. The energy chain according to claim 14, wherein:

the cross bar is fastened to a fastening protrusion of the side plate by a lever mechanism, wherein the skid has a cutout for an operating lever of the cross bar on its upper side, or the cross bar is fastened in a latching manner to a latching horn on the inner surface of the respective side plate.

16. A chain link for an energy chain, the chain link comprising:

two side plates and two cross bars connecting the side plates, wherein two skids are fastened to one of the cross bars by a holding device each and in each case reach over a narrow side of one of the two side plates in an operative position, wherein at both of its ends, at least the cross bar provided with skids has in each case a widening towards the side plate, and wherein the holding device has two opposing holding elements, which are spaced apart in a longitudinal direction and with which the holding device is fittable onto the cross bar between the widenings and is displaceable laterally outwards into an engagement with one of the widenings, in which engagement the opposing holding elements engage in a positive-locking and/or force-locking manner in or behind an area of this widening to fasten the skid in the operative position.

* * * * *